(12) United States Patent  (10) Patent No.: US 7,452,468 B2
Smith  (45) Date of Patent: Nov. 18, 2008

(54) METHOD AND APPARATUS FOR TREATMENT OF WASTEWATER

(76) Inventor: William G. Smith, 250 Dannell Rd., Radnor, PA (US) 19087

( * ) Notice: Subject to any disclaimer, the term of this patent is extended or adjusted under 35 U.S.C. 154(b) by 80 days.

(21) Appl. No.: 11/534,770

(22) Filed: Sep. 25, 2006

(65) Prior Publication Data

US 2008/0073270 A1 Mar. 27, 2008

(51) Int. Cl.
*C02F 3/06* (2006.01)
*C02F 3/12* (2006.01)

(52) U.S. Cl. .................. 210/616; 210/617; 210/620; 210/626

(58) Field of Classification Search ........... 210/615, 210/616, 617, 618, 620, 626, 150, 151
See application file for complete search history.

(56) References Cited

U.S. PATENT DOCUMENTS

| | | | |
|---|---|---|---|
| 4,069,156 A | | 1/1978 | Mason |
| 4,184,946 A | | 1/1980 | Kato |
| 4,282,102 A | | 8/1981 | Rooney |
| 4,427,548 A | * | 1/1984 | Quick, Jr. .................. 210/617 |
| 4,810,385 A | * | 3/1989 | Hater et al. ................. 210/615 |
| 4,826,601 A | | 5/1989 | Spratt et al. |
| 4,919,815 A | * | 4/1990 | Copa et al. .................. 210/616 |
| 5,019,254 A | * | 5/1991 | Abrevaya et al. ............ 210/616 |
| 5,030,353 A | | 7/1991 | Stuth |
| 5,068,036 A | * | 11/1991 | Li et al. ....................... 210/616 |
| 5,202,027 A | | 4/1993 | Stuth |
| 5,217,616 A | * | 6/1993 | Sanyal et al. ................ 210/617 |
| 5,387,738 A | | 2/1995 | Beckham et al. |
| 5,454,949 A | | 10/1995 | Davis et al. |
| 5,632,896 A | | 5/1997 | Vandervelde et al. |
| 5,674,399 A | | 10/1997 | Davis |
| 5,720,876 A | | 2/1998 | Mackrle et al. |
| 5,980,738 A | * | 11/1999 | Heitkamp et al. ........... 210/150 |
| 5,993,650 A | | 11/1999 | Kim |
| 6,319,873 B1 | * | 11/2001 | Herve ......................... 210/616 |
| 6,395,522 B1 | * | 5/2002 | DeFilippi et al. ............ 210/617 |
| 6,524,849 B1 | * | 2/2003 | Adams et al. ................ 210/150 |
| 6,617,155 B1 | | 9/2003 | Van Toever |
| 6,808,622 B2 | * | 10/2004 | Okamoto et al. ............ 210/151 |
| 6,926,830 B2 | | 8/2005 | Ho et al. |
| 6,942,788 B1 | | 9/2005 | Cox et al. |
| 7,001,519 B2 | | 2/2006 | Linden et al. |
| 7,018,534 B2 | | 3/2006 | Frisch |
| 7,132,050 B2 | * | 11/2006 | Davis et al. ................. 210/617 |
| 2004/0144720 A1 | * | 7/2004 | Horing et al. ............... 210/617 |
| 2005/0269262 A1 | | 12/2005 | McBride |
| 2006/0180546 A1 | * | 8/2006 | Stuth et al. .................. 210/617 |

OTHER PUBLICATIONS

Hu, J.Y., Use of a Sequencing Batch Reactor for Nitrogen and Phosphorus Removal from Municipal Wastewater, Journal of Environmental Engineering, May 2005, 734-744.

* cited by examiner

*Primary Examiner*—Christopher Upton
(74) *Attorney, Agent, or Firm*—Design IP

(57) ABSTRACT

Introducing a combination of suspended attached growth Medias and biological reactants into a sewage treatment process with or without additional reaction to improve and increase capacity of a given process. Media and biological reactants can be disposed in a perforated container or flexible container that can be submerged in a sequencing bed reactor or the aeration and/or mixing tanks of an activated sludge sewage treatment process.

15 Claims, 4 Drawing Sheets

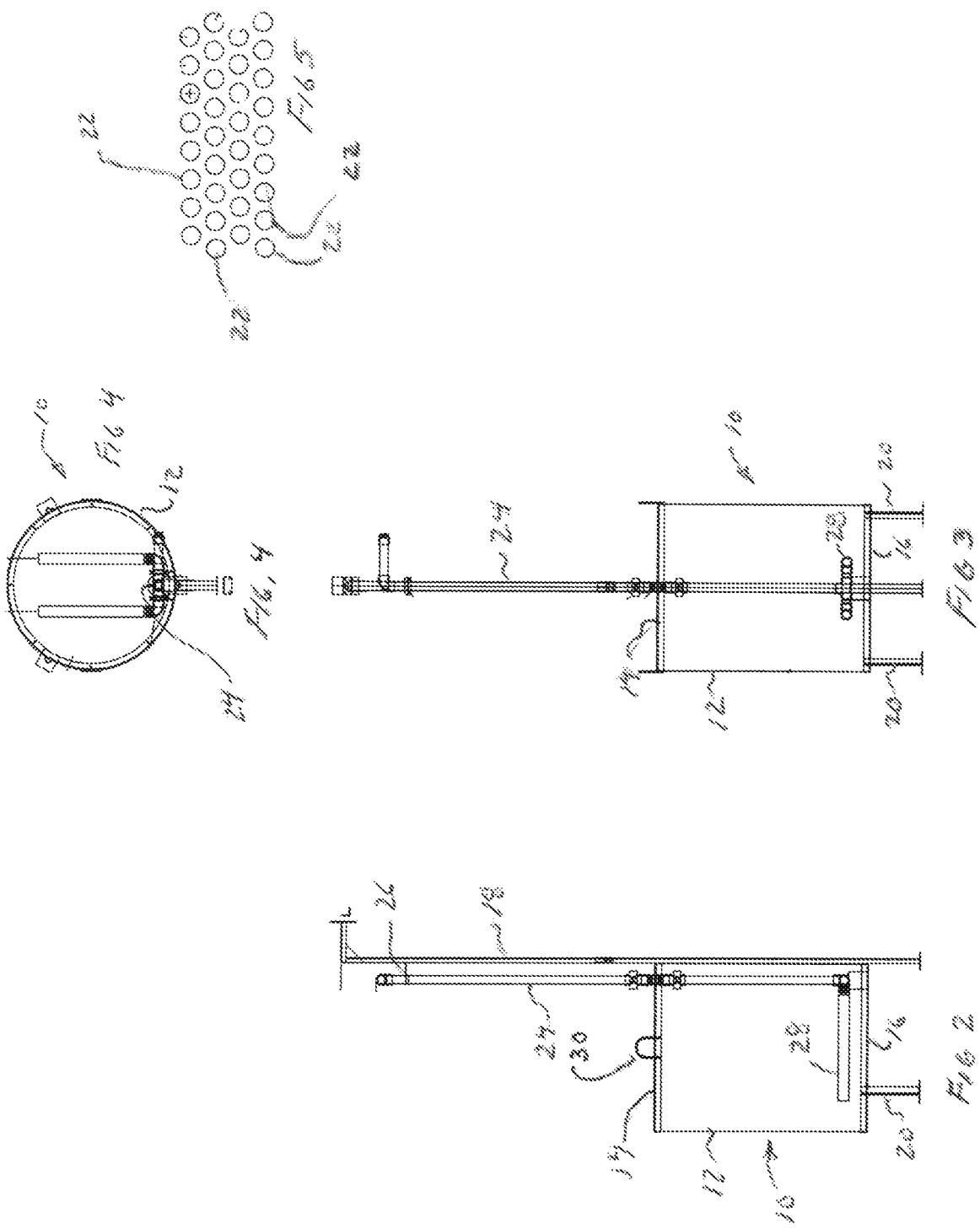

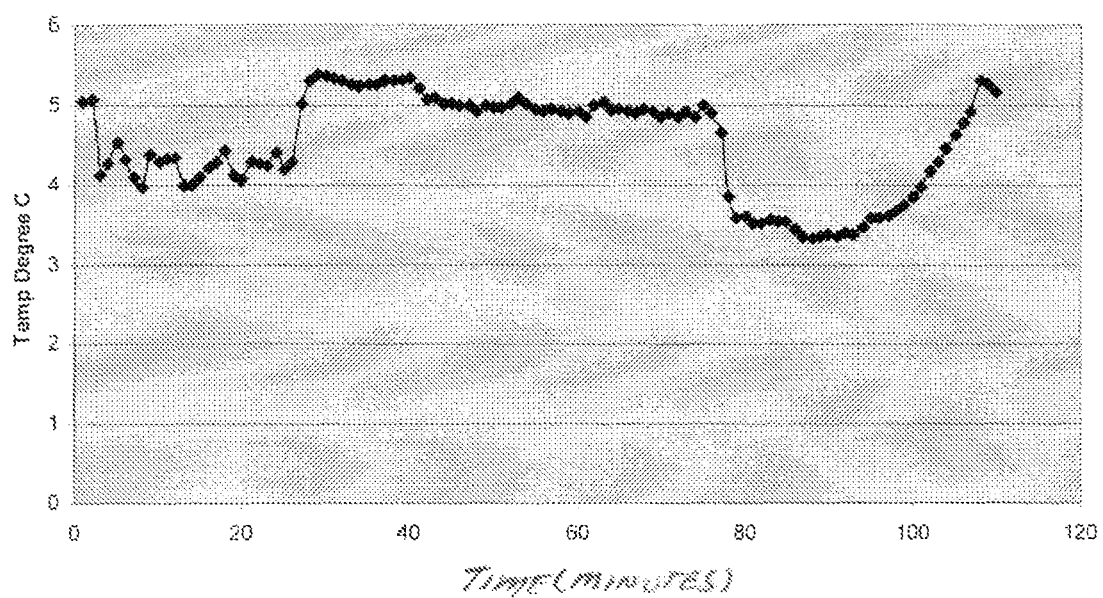

METHOD AND APPARATUS FOR TREATMENT OF WASTEWATER

BACKGROUND OF THE INVENTION

The present invention pertains to a method and apparatus for the treatment of wastewaters, more specifically, sanitary wastewaters, with a combination of materials, apparatus and equipment for both improvement of the treatment processes as well as the creation of additional treatment capacity. More particularly, the present invention pertains to a method and apparatus for retrofitting an activated sludge process, either anoxic or oxic with high surface area materials as well as either intermittently or continuously feeding of selected biological and zeolitic material.

Over the past 10-15 years there has been an increase in the use of the Suspended Attached Growth systems in the activated sludge processes because of the inherently more efficient batch settling and often higher treatment efficiency for contaminants removal than is possible with the conventional suspended growth activated sludge process. One modification of the activated sludge process is referred to as the SBR (Sequencing Batch Reactor) process which uses the same vessel for batch biological reactions and quiescent batch settling. Thus, the SBR process eliminates the major cost of dedicated final clarifiers necessary for the conventional flow through activated sludge process.

Wide variations in both the hydraulic and biological loading as well as temperature in either suspended or suspended/attached growth activated sludge treatment process give rise to numerous operating problems as well as process inefficiency. Sequencing Batch Reactor operations become problematic when the volume or wastewater characteristics exceed the ranges designed into the timers employed by truly batch operations. Any agent or combination of agents that can improve or expand the range of the operation band for batch type plants, as well as for flow through plants, will reduce the operating requirements as well as compliance excursions with effluent standards as well as being cost effective.

A particular plant was experiencing wide variations in applied hydraulic and organic loadings due to seasonal/recreational activities e.g. weekend vs. weekday flows. Superimposed on top of these varying loads was a large educational complex with its related variations in flows due to varying operation schedules as well as wastewater characteristics. In addition, the educational complex generated wastewater that was high in ammonia which was transported to the wastewater treatment plant via an 18,000 foot long force main laid in bedrock which acted as a refrigeration unit for 5 months out of the year, assuring wastewater at temperatures in the 4 to 5° C. (39.2 to 41.0° F.) range. The plant when purchased by a new owner had to address the compliance issues inherited with the purchase of the facility.

The raw waste exhibited ammonia nitrogen levels in the range of 50 to 90+mg/l with Chemical Oxygen Demand (COD) levels as high as 1100+mg/l as well as temperatures of 4 Degrees C. Adjustment of the sequence times for longer aeration and mixing to address the reduction of these values was met with limited success. In addition, due to the wide swings in wastewater characteristics, swings in food to organism ratios were incurred with the resulting decrease in the settleablilty of the sludge and subsequent loss of solids during the decant sequence of the plant. The plant also had problems meeting its nitrate and nitrite requirements year round.

Zeolites have been successfully employed for improved wastewater treatment plant performance in accordance with the published literature and can provide a stabilizing effect during both long term and short term so fluctuations in sludge settleablilty and bacterial mass in the activated sludge process, especially SBR type of plants are improved. It provides not only a weighting agent for increasing the sludge settling characteristics but also a platform for bacterial growth which performs a function similar to that of a suspended attached growth system.

Biological agents available from Organica Biotech Inc. have improved the performance of activated sludge processes, both aerobic and anoxic for the removal of carbonaceous as well as nitrogenous materials.

A number of devices exist for placing materials in wastewater environments as well as a number of patented materials for improvement of wastewater treatment. The materials take on many physical shapes and sizes primarily being constructed of plastic materials which provide a high surface area where biological growth can occur.

A number of patents describe methods and devices for using microbes to treat organic wastes in sewers and other similar environments. Several of these patents disclose processes which use containers that can be immersed or submerged directly into the waste-laden environments to be treated. Examples of such patents include U.S. Pat. No. 4,670,149 to Francis; U.S. Pat. No. 4,810,385 to Hater, et al.; U.S. Pat. No. 4,925,564 to Francis; U.S. Pat. No. 5,516,687 to Perez, et al., U.S. Pat. No. 5,911,877 to Perez, et al.; U.S. Pat. No. 5,879,932 to Van Erdewyk, et al.; U.S. Pat. No. 5,935,843 to Glendening, et al.; and U.S. Pat. No. 6,248,234 to Cline.

SUMMARY OF THE INVENTION

The present invention is a method and apparatus for treatment of wastewater, e.g. sanitary wastewater in an activated sludge process or a sequencing batch reactor (SBR) modification of the activated sludge process.

Incorporation of a combination of synthetic growth support media, zeolitic materials and biological agents in either a container to be submerged in the wastewater bioreactors and/or directly in bioreactors with proper screening will improve the overall efficiency of the process.

The zeolitic material and biological agents can be dispersed in a sequencing batch reactor or the bioreactors of a conventional flow through activated sludge process.

Therefore, in one aspect the present invention is a method for improving a wastewater treating process employing one of activated sludge or a sequencing batch reactor process comprising the steps of: introducing into one or more of the bioreactor tanks of an activated sludge treatment process or a sequencing batch reactor a quantity of synthetic biological growth support media together with a zeolitic material being one of clinoptilolite, mordenite, chabazite or phillipsite, and one or more biological agents to effect one or more of an increased production of extra cellular polysacharide for better liquid solid separation, removal of ammonia-nitrification, denitrification, removal of carbonaceous material, reduce surfactant interference with liquid solid separation, provide a balanced nutrient formulation in the wastewater, phosphate removal and odor removal.

BRIEF DESCRIPTION OF THE DRAWINGS

The present invention will hereinafter be described in conjunction with the appended drawing figures wherein like numerals denote like elements.

FIG. 1 is a plot of solids retention against time for use of zeolitic material according to the present invention.

FIG. 3 is a front elevational view of the vessel of FIG. 3.

FIG. 4 is a top plan view of the device of FIG. 3.

FIG. 5 is a fragmentary view of the perforation for the top, bottom and walls of the device of FIG. 3.

FIG. 7 is a plot of temperature against time for a twelve hour period inside an SBR plant on a typical winter day.

DETAILED DESCRIPTION OF THE PREFERRED EMBODIMENTS

Figure 2:
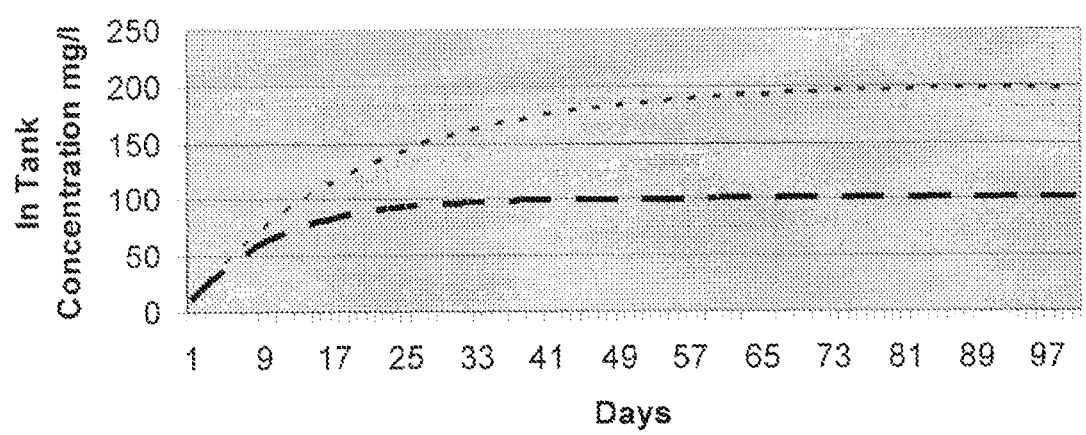
FIG. 2 is a side elevational view of a containment vessel according to the present invention.

A two train Sequencing Batch Reactor (SBR) plant with each train having a 50,000 gallon tank was out of compliance due to excessively high concentrations of COD and BOD, ammonia-nitrogen, low conversion of nitrate nitrogen, poor settling, low BOD5 removal and very low temperatures.

In a first part of the process of the present invention, ReNuGen brand zeolites, obtained from Daleco Resources Corporation of West Chester, Pa., were employed at a dosage of 20 parts per million based on the average daily flow to the plant. It should be noted that the SBR process employs a batch volume, in other words only a certain portion of the tank volume is removed and replaced with each batch. With two trains (2) and two (2) batches each treatment sequence would treat 12,500 gallons per batch (batch volume) for a daily treatment capacity of 50,000 gallons per day.

The zeolitic material addition operated as a weighting agent, substrate and structural unit for bacterial growth to occur. In wastewater treatment it is the culturing of assimilated bacteria to the wastewater composition that affects the treatment process performance. Employing a zeolitic material allowed more bacteria to grow and stay in the process longer to affect the treatment process performance, stability and operability.

In order for the zeolites to reach an effective level in the waste treatment process an optimum dose must be reached; in this case 10 to 20 parts per million, for the whole tank volume. Additionally, since the bacteria must grow and create a culture on the zeolites material the zeolites effectiveness is directly related to the Solids Retention Time (SRT) in the treatment system. In this application the daily flow of 50,000 gallons per day would be $((50,000*8.34*20)/1,000,000)$ or 8.34 pounds per day. Because the sludge age (total mass of solids in the reactor divided by the mass wasted per day) was 10 days and each reactor was receiving 25,000 gallons per day, each reactor would be receiving 4.17 pounds of material. Since each reactor had a working volume (completely filled) of 50,000 gallons the first day, the concentration of the zeolites material in each reactor would be equal to $((1,000,000*4.17)/(50,000*8.34)=10$ parts per million of which $1/10^{th}$ would be lost to wasting based on the sludge age. On day two there would be 9 parts per million in the reactor and another 10 added for 19 parts per million but would waste 1.9 parts per million so that over a period of approximately 40+days one would reach a steady state value of 100 parts per million of zeolites in the treatment tank, as well as the suspended solids as shown by the plot of FIG. 1. If the sludge age is doubled to 20 days, then the concentration in the tank would be almost 200 parts per million.

If the average surface area for zeolites is 14 square meters per gram, and in the 10 day sludge age example there would be 42 pounds of zeolites in the reactor tank, then with a 1% effective growth area for bacterial growth one would have over 2,672 square meters of surface area at a sludge age of 10 days and over 5,000 square meters of surface area at a sludge age of 20 days. The effectiveness of increasing surface area for bacterial growth in wastewater treatment via numerous methods is well documented in the literature. The calculation for reaching steady state is different, as shown in the chart for an SBR because the dosage is based on the batch volume. Taking the amount of zeolitic material up to the steady state concentration has been employed; however, it still takes a number of sludge ages for the zeolitic material in the reactor to develop the bacterial colonization.

Using removal rates for BOD5 for the zeolitic material is equivalent to moving bed reactor material media also referred to as suspended attached growth media with a 1.25% effective surface area for the total amount of zeolitic material that is in the system at a steady state the BOD5 removal could be improved by approximately 6% as shown in the data of Table 1.

TABLE 1

| Status | Input | Name | Output | Unit | Comment |
|---|---|---|---|---|---|
|  | 14 | ReNuGenArea |  | m^2/g | ReNuGen Specific Surface Area |
|  | 20 | Dose |  | mg/l | Applied Daily Dose of ReNuGen |
|  | 10 | SludgeAge |  | day | Sludge Age |
|  | 25,000 | AppliedFlow |  | gal/day | Applied Flow to the Oxic Reactor |
|  |  | AppliedReNuGen | 4.17 | lb/day | Daily applied does of ReNuGen |
|  |  | RenugenAreaIncrease | 265,279 | m^2 | Total Surface Area added after sludge age |
|  |  | ReNuGenDelta | 26,528 | m^2 | Daily Surface Area added daily |
|  |  | MediaEquivalent | 4.14 | m^3 | Gross equivalent amount of MRRB equivalent by ReNuGen |
|  | 1.25% | Effectiveness |  | % | Effective area of ReNuGen |
|  |  |  |  |  | ====> BOD5 Calculations <=== |
| L | 225 | AppliedBOD5 |  | mg/l | Applied BOD5 concentration to the Reactor |
|  | 8,000 | RdBOD5Refmax |  | gram BOD5/m^3-day | Maximum Reference BOD5 Rate for Reference Media |
|  |  | AppliedBOD5Mass | 46.91 | lb/day | Applied BOD5 to the Oxic Reactor |
|  | 800 | RefMediaArea |  | m^2/m^3 | Reference synthetic high surface area media |
|  |  | % k2 |  |  | Temperature Correction Coefficient |
|  | 1 | % k1 |  |  | Unit Coefficient |
|  | 8 | % Temp |  | ° C. | Operating Temperature |

In a second part of the present invention, the SBR reactors were retrofitted with canisters containing moving bed bioreactor media sold under the trade name MBBR by Anoxkaldnes Global AB of Sweden, or a suspended attached growth media. In this particular application a high surface area suspended attached growth media sold under the name AMB Bio Media was obtained from EEC North America, of Blue Bell, PA and installed in aerated and/or mixed canisters for the containment of the media.

Referring to FIG. 2, one vessel for implementing the present invention is shown as 10. Vessel 10 has a generally cylindrical body 12 and a top 14 and bottom 16. On one side of the vessel body 12 is an extended structural member 18 which can be used to place the vessel in a sewage treatment tank. The structural member 18 can extend past the bottom 16 of the tank 10 in order to place the tank 10 a distance above the floor of the sewage treatment vessel. Additional legs 20 will be provided to balance the tank in a generally vertical position inside of the sewage treatment vessel.

As shown in FIG. 5, the top 14, bottom 16 and body 12 of the vessel 10 are provided with a series of perforations 22 is a pattern such as shown in FIG. 5. The perforations are of a size and are placed in a pattern so that there can be adequate fluid flow through the vessel 10.

Referring to FIG. 3 and FIG. 4, vessel 10 can be fitted with a pipe 24 which can be fastened to structural number 18 as by a strap, the pipe extending into the vessel 10 and terminating in a diffuser 28 so that air or other oxidizing fluid can be introduced into the vessel 12 to aid in the biological process. Vessel 12 has cover 14 fitted with a lifting device such as handle 30 to permit media to be disposed within the vessel or tank 10. The media may be placed in bags which are inserted into the vessel or may be placed directly into the vessel in an area adapted, e.g. by screens, to contain and maintain in bulk quantities of one or more synthetic growth media, zeolitic compositions and or biological material in contact with the wastewater being treated.

Vessel 10 can also be fitted with spargers and/or mixers known in sewage treatment processing for aeration and/or mixing.

It is also within the purview of the present invention to use perforated bags containing the plastic media, which bags can be weighted and placed inside of the sewage treatment vessels or bioreactors and subsequently having the zeolitic and biological materials added to the bioreactors fitted with the perforated bags.

The SBR reactor tanks were retrofitted with three canisters each holding 0.6 cubic meters of high surface area media. The canisters were fitted with aeration diffusers that were aerated when the SBR sequence called for aeration. The high surface area media had a surface area of 800 square meters per cubic meter of media. The 50,000 gallon reactors were retrofitted with 1.8 cubic meters or 63.6 cubic feet of media for an additional installed surface area of 15,500 square feet of surface media (1,440 square meters). The 50,000 gallon tanks then had an affective surface area over 1,440+2,672 square meters for 4,112 square meters of surface area or 44,245 square feet installed.

The high surface area media was sampled for growth of attached bacteria after approximately 45 days and found to have increased the total biomass by approximately 30%. It has been shown that adding surface area to a wastewater biological process will promote increased bacterial growth which allows for an increased biological activity and thus improvements in the process performance. This is valid for aerobic, anoxic and anaerobic processes.

The addition of highly specialized and cultured bacteria to a system with more available sites for growth creates an environment very beneficial to improved plant performance by assuring the presence of a culture of the correct organisms and their supporting nutrient requirements rather than relying on the naturally occurring system solely to create an assimilated culture. In addition, the use of adapted naturally occurring organisms e.g. for cold weather nitrification and denitrification allows for the processes to attain the required effluent criteria without the use of expensive energy intensive solutions. Such a material was obtained from Organica Biotech Inc. and identified as OrganicaBac Wastewater Series. In the 50,000 gallon SBR reactor studied, prior to the use of process of the present invention immersion heaters were employed due to the waste being at 4 degrees C. at an energy cost of over $18,000 for 4 months for one train alone. With the use of this method and system the heaters have not been employed. The annual savings is in excess of $36,000 per year on energy for an installed cost for the canister devices of $20,000 and an operating cost of $11,000 per year which equates to less than one year payback.

The amount of especially cultured bacterial material added is dependent upon the site conditions and treatment processes employed. Normally, 1 to 10 parts per million of the selected cultured bacteria based on daily plant flow to the treatment unit is employed. In the case of the SBR unit treating 30,000 gallons per day, 0.25 pounds per day were added for warmweather operations (15 Degrees C.) to 1.0 pounds per day when the unit was operating at 4 Degrees C. At 30,000 gallons per day 0.25 pounds is approximately 1 part per million. $(1,000,000*0.25)/(30,000*8.34))$ These dosages were employed for both nitrification and denitrification processes as well as carbonaceous processes.

It is the retrofitting of wastewater treatment processes with two types of suspended attached growth media supplemented with selected bacterial products that produces enhanced treatment performance, i.e. facilitates either additional treatment capacity or improved treatment compliance with permitted effluent standards or both at a wider range of temperatures, especially below 8° C. (46.4° F.).

In an actual field installation, canisters according to the invention were installed in a batch activated sludge treatment system containing plastic high surface media (AMB Bio Media media) to which is added on a regular basis bacterial agents obtained from Organica Biotech such as described and claimed in U.S. Pat. Nos. 5,877,113, 6,057,278 and zeolites obtained from Daleco Resources Inc. such as described and claimed in U.S. Pat. No. 5,387,378. The canisters are equipped with both aeration and mixing equipment.

Figure 6:
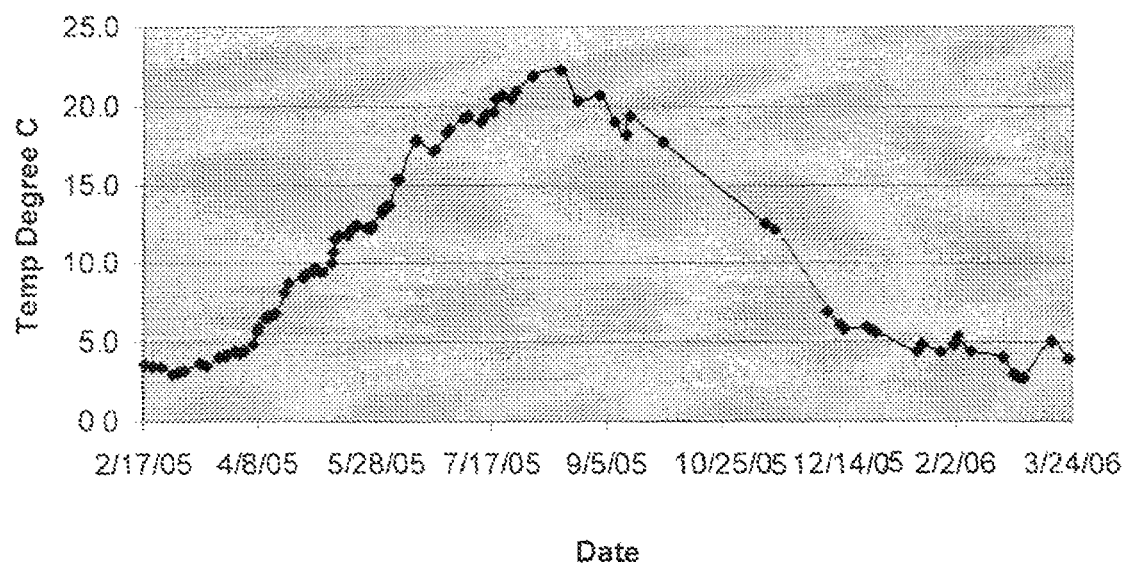
FIG. 6 is a plot of temperature against time for a sewage treatment facility prior to employing the processes and apparatus of the present invention.

The plot of FIG. 6 shows the temperature profile of the SBR reactor as measured in the tank when samples were obtained. It should be noted that the process used in this facility was out of compliance until modification according to the present invention. The temperature of the wastewater in the SBR reactor is at or below the temperature employed for storage of BOD samples as required by Standard Methods.

The facility produced effluent with ammonia nitrogen of 3 mg/L in the summer or fall and 9 mg/L in the colder winter months which results are consistent with the standards for the facility.

As a specific example the method and apparatus of the present invention were used to retrofit an out of compliance 50,000 gallon per Sequencing Batch Reactor plant. The plant was configured as a two train 4 batches per day treatment process. The plant was receiving waste from several resort communities, as well as a high school that was serviced by a force main that was over 18,000 feet away. The wastewater from both the resorts and high school employed long force mains, which during the winter cause the incoming wastewater to be at or near freezing temperatures. In addition, wide swings in the wastewater composition were incurred especially with respect to the ammonia levels.

Table 2 sets forth wastewater composition data typical of the mixture of both wastewaters. It was not uncommon to have the volume of resort wastewater to be less than the volume of the school wastewater during part of the day or week while the conditions were reversed on the weekends and holidays.

TABLE 2

Partial Wastewater Composition Parameters

| Combined Raw Waste pH | Combined Raw Waste NH3 | Combined Raw Waste PO4 | Combined Raw Waste COD |
|---|---|---|---|
|  |  |  | 1,432 |
|  |  |  | 214 |
|  | 70.00 |  | 353 |
|  |  |  | 353 |
|  |  |  | 377 |
|  |  |  | 376 |
| 7.40 | 62.50 |  | 360 |
| 8.00 | 48.00 | 4.00 | 527 |
| 7.70 | 45.00 | 18.00 | 910 |
| 8.90 | 51.75 | 0.19 | 364 |
| 9.70 | 102.00 | 0.19 | 704 |
| 8.50 | 87.50 | 8.75 | 712 |
|  | 66.68* | 6.23* | 557* |

*Average values

The performance of the plant with respect to meeting its effluent requirements was erratic. The wide swings in loadings along with wide swings in wastewater flows when coupled with a Sequencing Batch Reactor type of activated sludge plant lead to treatment process problems even from batch to batch. Table 3 shows the plant performance prior to implementation of the present invention.

TABLE 3

Effluent from SBR Plant

|  | Permit | Dec | Jan | Feb | Mar | Apr | May | Jun | Jul | Aug | Setp | Oct |
|---|---|---|---|---|---|---|---|---|---|---|---|---|
| Flow | 0.5 |  |  | 0.025 | 0.03 | 0.027 |  | 0.023 | 0.024 | 0.023 | 0.025 | 0.026 |
| CBOD5 | 10 | 11 | 6 | 3 | 12.3 | 8.9 | 12.4 | 3 | 15.7 | 6.4 | 8.6 | 7.2 |
| TSS | 30 | 12 | 9 | 14.8 | 34 | 44 | 96.4 | 26.5 | 28.2 | 16.5 | 14.5 | 10.3 |
| NH3 5/1-10/31 | 3 |  |  | 40 | 27.3 | 6 | 0.7 | 4.3 | 22.6 |  |  |  |
| NH3 11/1-4/30 | 9 | 37 | 51 |  |  |  |  |  |  | 25.5 | 21.8 | 17 |
| NO3-NO2 | 14 | 0.2 | 0.8 | 1.7 | 2.9 | 7.2 | 3.5 | 4.9 | 2.1 | 0.5 | 0.4 | 0.2 |
| Fecal 5/1-9/30 | 200 |  |  |  | 130 | 500 | 90 | 10 | 80 |  |  |  |
| Fecal 10/1-4/30 | 2000 | 4000 | 3000 | 950 |  |  |  |  |  | 40 | 500 | 200 |
| PO4 | 1 | 1.8 | 2 | 2.5 | 2.4 | 2 | 3.8 | 2.4 | 3.7 | 1.3 | 0.7 | 0.5 |
| DO | 7 |  |  | 7.1 | 10 | 6.8 | 7.8 | 7.2 | 6.9 | 7.7 | 7.7 | 7.85 |

During the winter the wastewater in the SBR reactors could approach freezing levels. FIG. 7 is a plot of water temperature against time from data taken from a temperature logger installed in the SBR reactor which logged the water temperature every 5 minutes during a typical winter day. The plot represents 12 hours during which one batch of wastewater was treated. Being a batch treatment process there was fill time as well as react time, settle time, and decant time and idle time. The rise in temperature coincides with the addition of the wastewater to the reactor. In a SBR usually only 20% to 30% total volume is decanted with each batch.

The rising and falling of the temperature in the beginning is due to addition of wastewater while filling the reactor. Once the reactor is full it would go through its mixing, aeration, settling and decant cycles. Following the decant sequence the plant would go into an idle mode until filling for the next sequence began. As the logger data indicates the waste temperature varied from about 3 to 5° C. (37.4 to 41.0° F.).

From Table 3 one can see that the majority of effluent exceeded permitted limits for ammonia nitrogen. Since the effluent requirements included removal of nitrate and nitrite, as well as ammonia nitrogen with a low conversion of ammonia nitrogen, there would be a low value of nitrite and nitrate produced.

Table 4 shows the results of the sampling of decanted liquid from a number of typical batches of treated wastewater prior to employing the method and apparatus of the present invention.

TABLE 4

SBR Batch Effluent without the treatment process improvements
Without Canister, Bacteria, Zeolite

| TEMP ° C. | pH | NO2 | NO3 | NH3 | PO4 | COD |
|---|---|---|---|---|---|---|
| 3.9 | 7.1 | 1.1 | 5.1 | 15.9 | 0.7 |  |
| 3.6 | 7.3 | 2.0 | 4.0 | 7.1 | 0.7 | 78.0 |
| 3.4 | 7.1 | 1.8 | 3.0 | 13.7 | 0.6 | 82.0 |
| 3.4 | 7.2 | 1.4 | 4.0 | 12.9 | 0.8 | 70.0 |
| 3.0 | 7.1 | 0.0 | 2.0 | 17.2 | 0.2 |  |
| 3.1 | 7.0 | 2.5 | 6.0 | 9.5 | 0.2 | 35.0 |
| 3.2 | 7.0 | 1.4 | 4.0 | 7.4 | 0.6 | 99.0 |
| 3.7 | 7.0 | 1.2 | 2.0 | 12.5 | 0.4 | 96.0 |
| 3.5 | 7.2 | 1.5 | 2.2 | 15.2 | 0.5 | 55.0 |
| 4.0 | 7.1 | 0.5 | 2.0 | 18.7 | 0.5 |  |
| 3.5* |  | 1.3* | 3.4* | 13.0* | 0.5* | 74* |

TABLE 4-continued

SBR Batch Effluent without the treatment process improvements
Without Canister, Bacteria, Zeolite

| TEMP ° C. | pH | NO2 | NO3 | NH3 | PO4 | COD |
|---|---|---|---|---|---|---|
| 4.0 | 7.1 | 0.5 | 2.0 | 18.7 | 0.5 |  |
| 3.5* |  | 1.3* | 3.4* | 13.0* | 0.5* | 74* |

*AVERAGE VALUES

Note: The parameter values are lower due to the raw wastewater being diluted by 70% to 80% by the liquid left in the reactor after the decanted liquid is removed. The bottom row is the average values for the data.

The use of immersion heaters in the SBR reactor produced the improvement in plant performance shown in Table 4. It should be noted that the data set forth in Table 5 is also for the same period of time when the SBR reactor without the immersion heaters had an average temperature of 3.5° C. (38.3° F.).

TABLE 5

SBR Batch Effluent with the use of immersion heaters Without Canister, Bacteria, Zeolite with heaters

| TEMP(° C.) | pH | NO2 | NO3 | NH3 | PO4 | COD |
|---|---|---|---|---|---|---|
| 7.9 | 7.2 | 0.5 | 8.0 | 6.6 | 0.3 | 45.0 |
| 7.6 | 7.0 | 2.1 | 5.0 | 6.2 | 0.7 | 66.0 |
| 8.0 | 7.2 | 1.1 | 6.0 | 4.9 | 0.6 | |
| 8.0 | 7.3 | 0.0 | 9.0 | 1.2 | 0.3 | 53.0 |
| 7.5 | 7.1 | 1.3 | 12.0 | 1.1 | 0.7 | 23.0 |
| 8.1 | 7.1 | 2.3 | 10.0 | 4.5 | 0.4 | 25.0 |
| 7.9* | | 1.2* | 8.3* | 4.1* | 0.5* | 42* |

*AVERAGE VALUES

The use of the immersion heaters improved the performance by raising the temperature of the wastewater almost 5 Degrees C., but at a high cost. Performance data for the removal of ammonia, nitrite and nitrate below 7 to 8 Degrees C. is not well documented in the literature. Also it should be noted that the level of mixed liquor solids in the SBR reactor was allow to increase in order to have a high concentration of active bacteria for renovation of the wastewater.

The use of the plastic media, zeolites and bacteria for improved performance was based on creating in an activated sludge reactor more sites (media+zeolites) as well as a substrate (zeolites) for bacterial growth. The bacterial culture is supplied, on a daily basis, at a minimum, a starter culture of highly efficient bacteria specifically tailored for the removal of specific pollutants e.g. carbon, ammonia, nitrates, nitrites, and/or phosphorous. The amount of bacteria can be adjusted for the conditions encountered at a specific installation. Table 6 sets forth data taken from the same plant after implementation of the method and apparatus of the present invention. The plant was fitted with canisters containing 0.6 cubic meters of high surface area media, 1.0 lbs/day of cultivated bacteria and 4.0 lbs/day of zeolitic material.

TABLE 6

SBR Batch Effluent with the use of media, zeolites & bacteria With Canister, Bacteria, Zeolite

| TEMP ° C. | pH | NO2 | NO3 | NH3 | PO4 |
|---|---|---|---|---|---|
| 4.4 | 6.8 | 1.5 | 6.0 | 7.2 | 0.5 |
| 4.0 | 7.0 | 1.0 | 4.0 | 6.9 | 0.3 |
| 3.0 | 7.5 | 0.7 | 3.0 | 19.6 | 0.4 |
| 2.9 | 6.8 | 1.0 | 4.0 | 11.9 | |
| 2.7 | 6.9 | 0.3 | 4.0 | 1.3 | 0.4 |
| 2.8 | 7.2 | 1.4 | 5.0 | 12.0 | 0.3 |
| 2.7 | 7.1 | 0.4 | 5.0 | 10.9 | 0.3 |
| 3.1 | 6.5 | 1.5 | 6.0 | 6.5 | 0.4 |
| 3.2* | | 1.0* | 4.6* | 95* | 0.4* |

*AVERAGE VALUES

The data in Table 6 is from individual batches as was the previous data. The ammonia dropped from an average of 13 mg/l to 9 mg/l without the use of the heaters. There was a marked improvement of the plant performance and reliability as well as reduced operational manpower.

The following data is actual reported data for the plant after the implementation of the process and apparatus of the present invention. A comparison of Table 7 with Table 3 illustrates the dramatic improvement in performance of the plant as a result of the retrofit.

TABLE 7

Effluent from SBR Plant With implementation of media, zeolites & bacteria

| | Permit | Dec | Jan | Feb | Mar | Apr | May | Jun | Jul |
|---|---|---|---|---|---|---|---|---|---|
| Flow | 0.5 | 0.0259 | 0.026 | 0.0156 | 0.0248 | 0.0261 | 0.024 | 0.0332 | 0.0371 |
| CBOD5 | 10 | 7 | 3.5 | 3.5 | 5 | 4.8 | 8.5 | 4 | 7.3 |
| TSS | 30 | 2 | 2.8 | 3.8 | 4.3 | 6.4 | 5.3 | 5 | 3.5 |
| NH3 5/1-10/31 | 3 | | 6.8 | 4.8 | 7.4 | 1.6 | | | |
| NH3 11/1-4/30 | 9 | 0.2 | | | | | 1.7 | 0.7 | 0.5 |
| NO3-NO2 | 14 | 8.4 | 8.4 | 10.5 | 7.8 | 7 | 8.1 | 7.1 | 4.9 |
| Fecal 5/1-9/30 | 200 | | | | | | | 23 | 0 |
| Fecal 10/1-4/30 | 2000 | 50 | 0 | 0 | 1 | 58 | 0 | | |
| PO4 | 1 | 0.4 | 0.5 | 0.4 | 0.4 | 0.4 | 0.5 | 0.5 | 0.5 |
| DO | 7 | 7 | 7 | 7.2 | 72 | 7 | 6.9 | 7 | 7 |

The cost effectiveness of the implementation of the use of this method of activated sludge treatment for the 50,000 gallon per day plant is shown in Table 8. The savings are estimated at approximately $50,000 per year vs. the use of the immersion heaters. Even without factoring in the cost of the immersion heaters, the use of this method and process for treatment of wastewater in either a new or retrofitted activated sludge process makes it cost effective, let alone the compliance, operational and capacity advantages.

TABLE 8

Estimated Cost Effectiveness of Retrofit

| | | |
|---|---|---|
| Plant Flow | 50,000 | gal/day |
| Cost of Immersion Heaters | $15,000 | (If two sets installed - only one installed) |

TABLE 8-continued

Estimated Cost Effectiveness of Retrofit

| | | |
|---|---|---|
| Cost of Canisters | $20,000 | |
| Annual Cost of Zeolite | $ 4,000 | |
| Annual Cost of Bacteria | $10,000 | |
| Energy Cost without retrofit | $36,000 | year |
| Depreciation on Canisters | $ 1,000 | |
| Operating Costs | $15,000 | |
| Annual Savings | $21,000 | |
| Operating Labor Savings | $12,775 | Based on 1 hour per day |
| Total Savings | $48,775 | |
| Additional Treatment Capacity | 20.0% | |
| Total Cost | $34,000 | |
| Additional Treatment Capacity gpd | 10,000 | |
| Cost per gallon additional treatmer | $ 3.40 | |
| Sewer Rental | $ 400 | Annual Fee |
| Equivalent flow | 225 | gal/dwelling |
| Increase in Revenues | $17,778 | |

The foregoing detailed description provides illustrative embodiments only, and is not intended to limit the scope, applicability, or configuration of the invention. Referring to the detailed description of the preferred exemplary embodiments will provide those skilled in the art with an enabling description for implementing the invention. It should be understood that various changes may be made in the function and arrangement of elements without departing from the spirit and scope of the invention, as set forth in the appended claims.

The invention claimed is:

1. A method for improving a wastewater treating process employing one of activated sludge or a sequencing batch reactor comprising the steps of introducing into one or more of the reactor tanks of an activated sludge treatment process or a sequencing batch reactor a quantity of synthetic high surface area biological growth support media together with a separate natural zeolitic material being one of clinoptilolite, mordenite, chabazite or phillipsite and one or more separate cultured bacterial agents to effect one or more of an increase production of extra cellular polysaccharides for better liquid solid separation, removal of ammonia, denitrification, COD and BOD removal, reduction of surfactant interference with liquid solid separation, provide a balanced nutrient formulation in the wastewater, phosphate removal and odor removal.

2. A method according to claim 1 including the step of placing the high surface area synthetic growth media, zeolite material and cultured bacterial agent in a perforated generally cylindrical vessel adapted to be submerged in a moiety of said wastewater being treated.

3. A method according to claim 2 including the step of fitting the container with one or more of a mixer, sparger or aeration device.

4. A method according to claim 1 including the step of placing the synthetic growth media, zeolite material and cultured bacterial agent in a perforated bag adapted to be submerged in a moiety of said wastewater being treated.

5. A method for improving a wastewater treatment process utilizing aerobic, anoxic, anaerobic, and/or quiescence processes comprising the steps of introducing into said wastewater during an aerobic, anoxic, anaerobic or quiescence process a quantity of a synthetic biological growth support media, a separate natural zeolitic material and separate cultured bacterial agent, the mixture adapted to produce pollutant removal at ambient temperatures at or above 4° C. (39.2° F.).

6. A method according to claim 5 including the step of selecting the natural zeolitic material from the group consisting of clinoptilolite, mordenite, chabazite, phillipsite and mixtures thereof.

7. A method according to claim 6 including the step of selecting the cultured bacterial agent from the group consisting of an agent to increase production of extra cellular polysaccharide for better liquid solid separation, an agent for removal of ammonia, an agent to promote denitrification, an agent to reduce surfactant interference with liquid/solid separation, an agent to provide a balanced nutrient formulation in the wastewater, an agent to promote phosphate removal, an agent to promote odor removal and mixtures thereof, and an agent for the removal of BOD and COD.

8. A method for improving activated sludge sewage treatment process by introducing into said process a mixture of high surface area synthetic biological growth media, a separate natural zeolitic material being one of clinoptilolite, mordenite, chabazite or phillipsite and one or more separate cultured bacterial agents to effect one or more of an increased production of extra cellular polysaccharides for better liquid solid separation, removal of ammonia, denitrification, COD and BOD removal, reduction of surfactant interference with liquid solid separation, provide a balanced nutrient formulation in the wastewater, phosphate removal and odor removal.

9. A method according to claim 8 including the step of placing the synthetic growth media, zeolitic material and cultured bacterial agent in a perforated generally cylindrical vessel adapted to be submerged in a moiety of said wastewater being treated.

10. A method according to claim 9 including the step of fitting the container with one or more of a mixer, sparger or aeration device.

11. A method according to claim 8 including the step of placing the synthetic growth media, zeolite material and cultured bacterial agent in a perforated bag adapted to be submerged in a moiety of said wastewater being treated.

12. A method for improving a wastewater treating process employing a sequencing batch reactor comprising the steps of introducing into one or more of the reactor tanks of a sequencing batch reactor a quantity of synthetic biological growth support media together with a separate natural zeolitic material being one of clinoptilolite, mordenite, chabazite or phillipsite and one or more separate cultured bacterial agents to effect one or more of an increased production of extra cellular polysaccharides for better liquid solid separation, removal of ammonia, denitrification, COD and BOD removal, reduction of surfactant interference with liquid solid separation, provide a balanced nutrient formulation in the wastewater, phosphate removal and odor removal.

13. A method according to claim 12 including the step of placing the high surface area synthetic growth media, zeolitic material and cultured bacterial agent in a perforated generally cylindrical vessel adapted to be submerged in a moiety of said wastewater being treated.

14. A method according to claim 13 including the step of fitting the container with one or more of a mixer, sparger or aeration device.

15. A method according to claim 12 including the step of placing the high surface area synthetic growth media, zeolite material and cultured bacterial agent in a perforated bag adapted to be submerged in a moiety of said wastewater being treated.

* * * * *

UNITED STATES PATENT AND TRADEMARK OFFICE
CERTIFICATE OF CORRECTION

PATENT NO.         : 7,452,468 B2                                          Page 1 of 1
APPLICATION NO.    : 11/534770
DATED              : November 18, 2009
INVENTOR(S)        : Smith It is certified that error appears in the above-identified patent and that said Letters Patent is hereby corrected as shown below:

In column 6, line 39, change "6,057,278" to "6,057,268."

In column 6, line 41, change "5,387,378" to "5,387,738."

Signed and Sealed this

Twenty-sixth Day of January, 2010

David J. Kappos
*Director of the United States Patent and Trademark Office*